June 23, 1925.
W. W. DONNELLY
1,543,559
FILLER FOR THE CLAMPED ENDS OF BELTS
Filed April 15, 1925
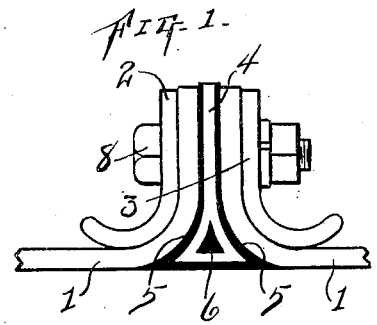
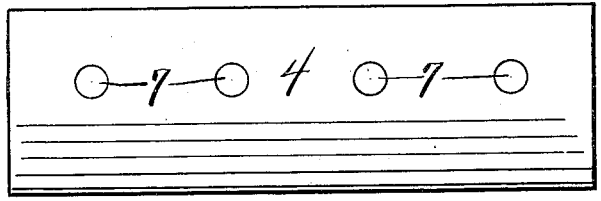
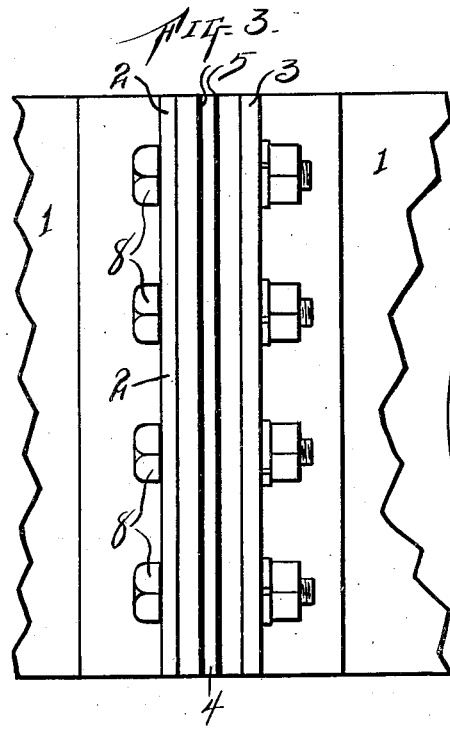
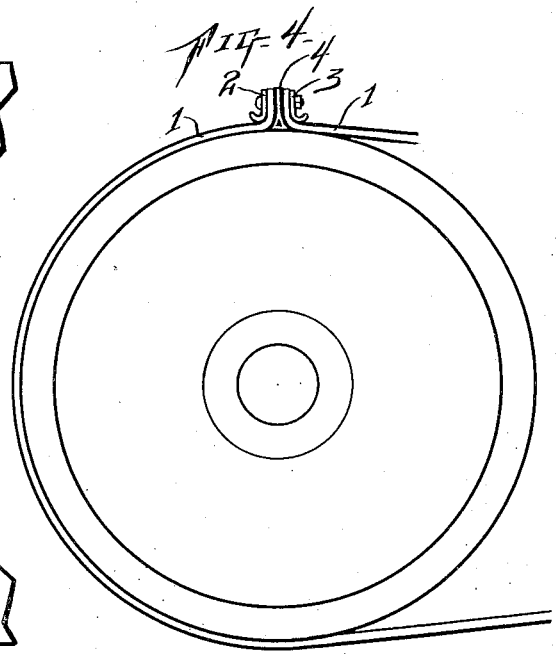
Inventor
WALTER W DONNELLY
By A. L. Jackson
Attorney Patented June 23, 1925.

1,543,559

UNITED STATES PATENT OFFICE.

WALTER W. DONNELLY, OF FORT WORTH, TEXAS.

FILLER FOR THE CLAMPED ENDS OF BELTS.

Application filed April 15, 1925. Serial No. 23,341.

*To all whom it may concern:*

Be it known that I, WALTER W. DONNELLY, a citizen of the United States, residing at Fort Worth, in the county of Tarrant and State of Texas, have invented certain new and useful Improvements in Fillers for the Clamped Ends of Belts, of which the following is a specification.

My invention relates to a filler for belt clamps and more particularly to that type of clamps which are used on the ends of belts that are turned outwardly; and the object is to provide a filler which will protect the belt against wear and rough usage and which can be manufactured ready for use on standard equipment and which is readily installed and which is removable so that new filler may be installed to take the place of the old filler. Other objects and advantages will be fully explained in the following description and the invention will be more particularly pointed out in the claims.

Reference is had to the accompanying drawings which form a part of this application.

Fig. 1 is an edge view of a belt equipped with clamps provided with the improved filler. Fig. 2 is a side elevation of a filler. Fig. 3 is a plan view of an assembled belt joint provided with clamps and the filler. Fig. 4 is a side elevation of a pulley on which is mounted a belt joint provided with clamps and the improved filler.

Similar characters of reference are used to indicate the same parts throughout the several views.

The ends 1 of a belt are shown connected by clamps 2 and 3. The filler 4 is caught in between the clamps 2 and 3. The filler consists of a body 4 of vulcanized fabric and a coating 5, preferably of pure Para rubber. The filler also contains an inclosed rubber filler 6. The rubber adds more or less resiliency to the filler. The inner end of the filler is enlarged to somewhat triangular shape to conform to the shape of the parts of the belt which are turned outwardly to be clamped. The filler is preferably manufactured complete with the openings 7 for bolts 8 which secure the clamps on the ends of the belt. When so made, the filler makes a standard article of manufacture and the use of it saves much time and avoids waste of time in preparing the filler. The filler is economical also because it protects the ends of the belts. The filler is sufficiently yielding to conform to the curvature of the pulley surface over which it is traveling.

What I claim is,—

1. A filler for the clamped ends of belts comprising a body member of vulcanized fabric having the inner end enlarged and curved to conform to the curvature of the belt and having the outer surface shaped to conform to the curvature of pulleys and a rubber filler embedded in the inner end of said body approximately triangular in shape.

2. A filler for the clamped ends of belts comprising a body member of vulcanized fabric having the inner end enlarged approximately triangular in shape to conform to the contour of the crease between the belt portions and to the inner pulley-engaging surface of the belt, and a filler of rubber embedded in said body in said triangular portion.

3. A filler for the clamped ends of belts comprising a body member of vulcanized fabric having the inner end enlarged approximately triangular in shape to conform to the contour of the crease between the belt portions and to the pulley-engaging surface of the belt, a filler of rubber embedded in said triangular portion, and covers of rubber vulcanized to the sides of said body.

In testimony whereof, I set my hand, this 11th day of April, 1925.

WALTER W. DONNELLY.